United States Patent [19]

Hehl

[11] 3,832,110
[45] Aug. 27, 1974

[54] INJECTION MOLD FOR AN INJECTION MOLDING MACHINE FOR MANUFACTURING TWO-COMPONENT PLASTIC OBJECTS

[76] Inventor: Karl Hehl, Siedlung 183, D-7291, Lossburg, Germany

[22] Filed: June 16, 1972

[21] Appl. No.: 263,471

[30] Foreign Application Priority Data
June 16, 1971 Germany.............................. 2129752

[52] U.S. Cl................. 425/130, 425/246, 425/438, 425/DIG. 51
[51] Int. Cl............................................. B29f 1/12
[58] Field of Search........... 425/134, 130, 450, 242, 425/246, 438, 451, 130, 242 R; 74/57, 127, 128, 129

[56] References Cited
UNITED STATES PATENTS

| | | | |
|---|---|---|---|
| 3,091,810 | 6/1963 | Turner | 425/3 |
| 3,435,483 | 4/1969 | Heiner et al. | 425/130 |
| 3,702,750 | 11/1972 | Veneria | 425/130 |
| 3,719,446 | 3/1973 | Cleevely | 425/438 X |
| 3,773,450 | 11/1973 | Svanfors | 425/130 |

FOREIGN PATENTS OR APPLICATIONS
1,267,831  5/1968  Germany .............................. 425/130

Primary Examiner—Robert D. Baldwin
Assistant Examiner—David S. Safran
Attorney, Agent, or Firm—Spencer & Kaye

[57] ABSTRACT

An injection mold for an injection molding machine for manufacturing two-component plastic objects. The mold includes a movable mold half having a core supporting profile plate, and a stationary mold half having a cavity plate and a transporting member. The profile plate has at least two diametrically disposed mold cores and the cavity plate has an equal number of diametrically disposed cavities. The shape of one-half of the mold cavities formed by the cores and cavities corresponds to the shape of part of the two-component object, and the shape of the other half of the mold cavities formed corresponds to the whole of the two-component object. The transporting member is pivotally mounted in the mold on an axis which is parallel to the opening direction of the mold and effects the transporting of the partly formed two-component object from its respective mold cavity into a mold cavity which forms the whole of the two-component object after the mold has been opened. The transporting member is configured as a plate separate from the profile plate and the cavity plate and is movable in the opening direction of the mold relative to the stationary mold half and to the movable mold half.

17 Claims, 12 Drawing Figures

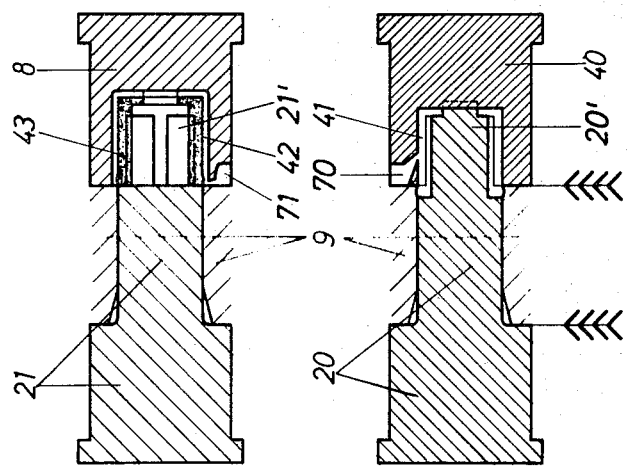
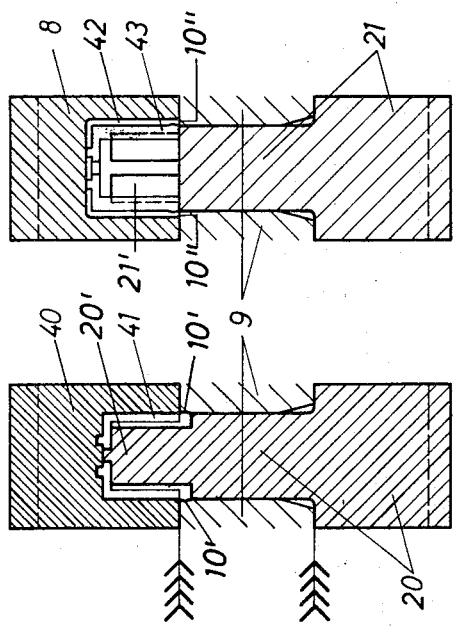

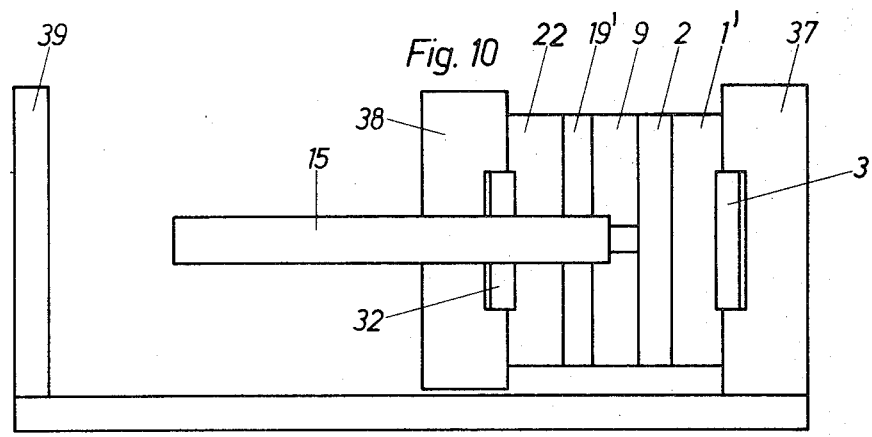
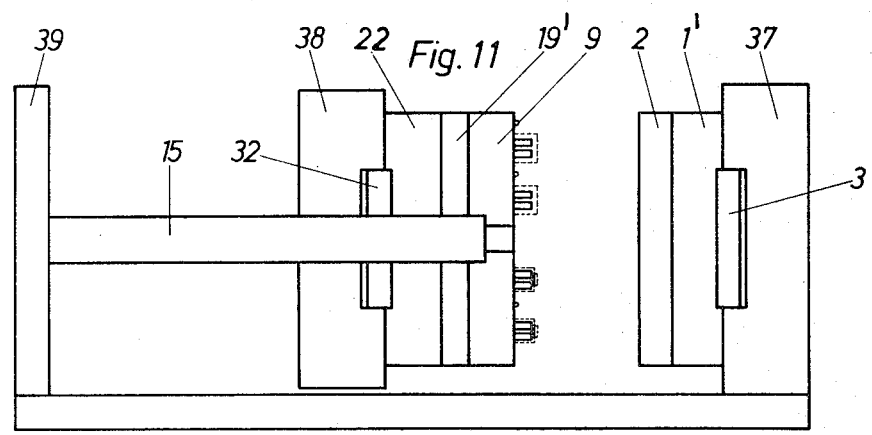
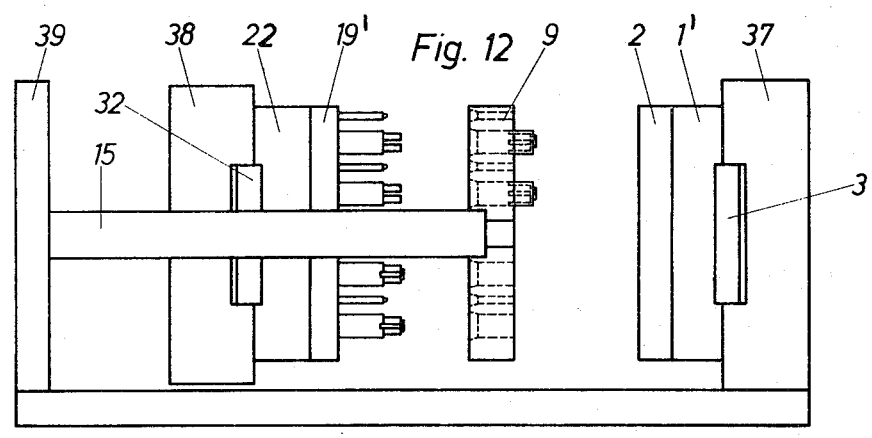

3,832,110

INJECTION MOLD FOR AN INJECTION MOLDING MACHINE FOR MANUFACTURING TWO-COMPONENT PLASTIC OBJECTS

BACKGROUND OF THE INVENTION

The present invention relates to an injection mold for an injection molding machine for manufacturing two-component objects. In particular the objects may be manufactured to include two colors or two materials.

The mold includes a core supporting profile plate having at least two diametrically disposed mold cores intended for the same two-component object, a cavity plate having at least two diametrically disposed cavities, and a pivotally mounted member. The cavities are arranged so that one-half thereof form along with a corresponding number of cores the shape of one color component or one material component of the two-component object, hereinafter referred to as the half object, and the other onehalf of the cavities forms along with a corresponding number of cores the shape of the entire two-component object, hereinafter referred to as the whole object. The half object can be transported from its cavity by means of the pivotally mounted member, which is mounted in the mold on an axis extending parallel to the opening direction of the mold, into the mold cavity for the whole object. The transporting of the half object is effected after the mold has been opened.

In a known injection molding machine of the type under consideration, the pivotally mounted transporting member constitutes a relatively large composite part of the mold which includes the cavity plate of the mold. During each operating cycle a relatively large mass must be moved so that the drive means for the movement are relatively highly stressed during the starting and stopping of the pivoting movement. Such a machine is disclosed, for example, in German Pat. No. 1,267,831.

SUMMARY OF THE INVENTION

It is, therefore, an object of the present invention to provide an injection mold of the above type in which the abovementioned stresses are substantially eliminated.

It is another object of the present invention to provide an injection mold of the above type in which the transporting member is movable relative to the stationary mold half and to the movable mold half of the mold.

It is yet another object of the present invention to provide an injection mold of the above type in which the transporting member is mounted on a drive shaft which is axially displaceable in the movable mold half and pivotal with respect thereto.

These and other objects are accomplished according to the present invention by the provision of an injection mold of the above-mentioned type in that the transporting member is configured as a plate separate from the profile plate and the cavity plate, respectively, and which is movable in the opening direction of the mold relative to the stationary mold half and to the movable mold half.

Advisably the transporting plate is mounted on the free end of a drive rod which is rotatably disposed along the horizontal symmetry axis of the movable mold half.

In a preferred embodiment, the transporting plate is provided with bores which are disposed coaxially to the cores of the profile plate when the mold is either completely closed or completely opened. The inner diameter of the bores is equal to or greater than the maximum diameter of the cores.

The relative movement between the movable mold half and the transporting plate is controlled in such a manner that the transporting plate comes to lie on the side of the actual cores facing the movable clamping plate when the mold is closed, and when the mold is completely open it comes to lie on the other side of these cores.

According to a further feature of the present invention, the transporting plate is mounted on a drive rod to be axially displaceable in the movable mold half and pivotal with the aid of a device which has at least one helical groove in the outer surface of a drive shaft and at least one control pin which is mounted in the movable mold half and engages in the helical groove.

Advisably two diametrically disposed helical grooves are formed in the outer surface of the drive shaft. These grooves preferably terminate in diametrically disposed linear sections with the entrances of the helical grooves each communicating with the linear sections via an idling groove section. The base of this idling groove section is inclined toward the horizontal axis of symmetry of the mold and extends radially outwardly from the entrance of the helical groove toward the linear groove section.

BRIEF DESCRIPTION OF THE DRAWINGS

FIG. 4 is a cross-sectional detail view along the line 4—4 of FIGS. 2 and 3.

FIG. 5 is a cross-sectional detail view along the line 5—5 of FIGS. 2 and 3.

FIG. 6 is a cross-sectional detail view along the line 6—6 of FIGS. 2 and 3.

FIG. 7 is a cross-sectional detail view along line 7—7 of FIGS. 2 and 3.

FIGS. 10–12 are pictorial representations of the injection mold according to the present invention in a closed, partly open and opened position, respectively.

DESCRIPTION OF THE PREFERRED EMBODIMENTS

Figure 1:
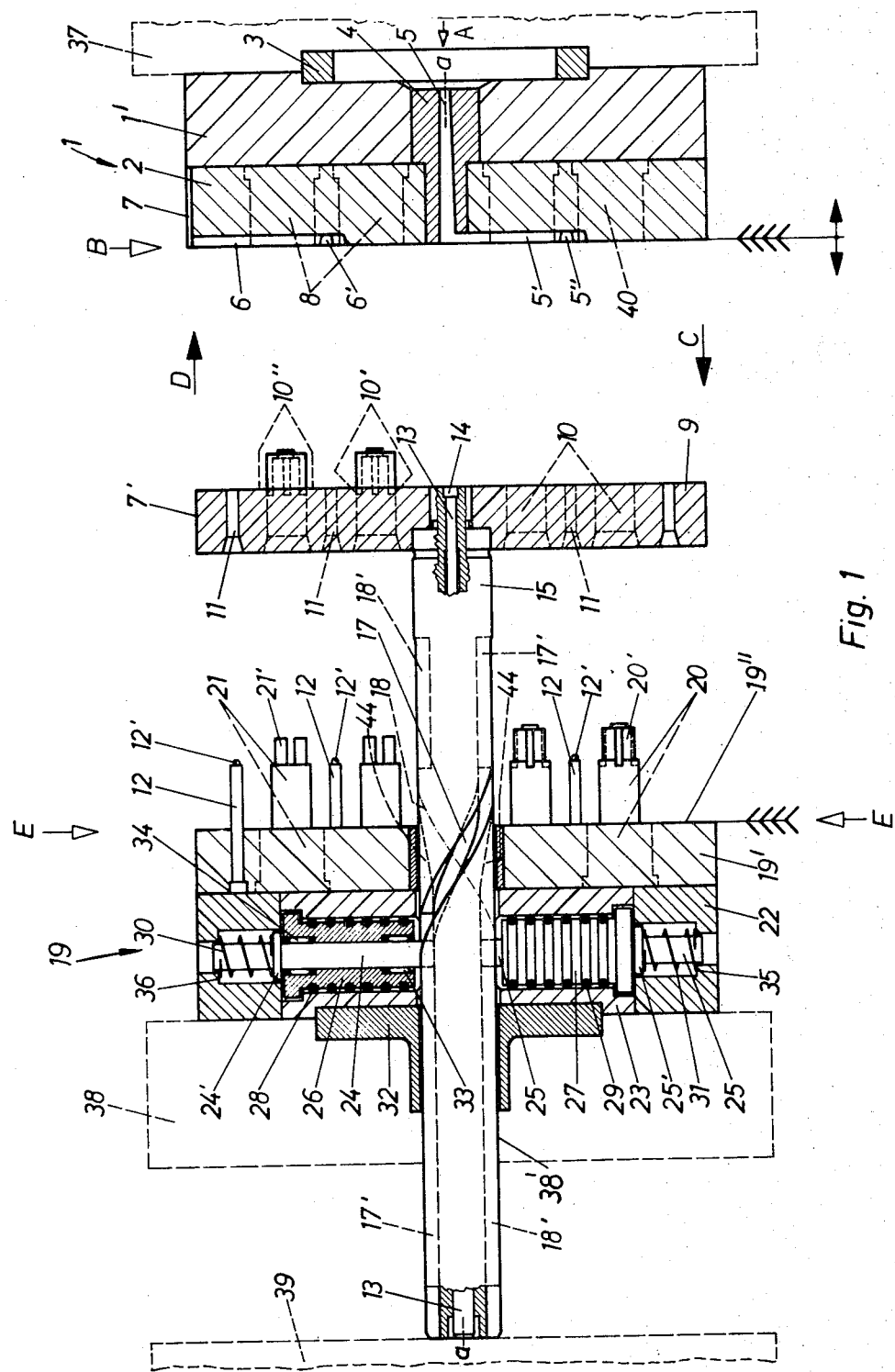
FIG. 1 is a longitudinal cross-sectional view along line 1—1 of FIGS. 2 and 3 of an injection mold according to the present invention shown in an open position.

Referring now more particularly to the drawings, the injection mold which serves to produce multi-material or multi-colored objects, includes a movable mold half 19 fastened to a movable mold clamping plate 38, a stationary mold half 1 fastened to a stationary clamping plate 37 and a transporting plate 9 disposed between the two mold halves 19 and 1.

The mold half 19 includes a profile plate 19' within which mold cores 20, 20' and 21, 21' are releasably fastened and exchangeably connected. The mold half 1 includes a cavity plate 2 within which interchangeable cavity inserts 8 and 40 are provided.

Each core has a cylindrical base portion 20, 21 which is releasably fastened in the profile plate 19' and an outer portion 20', 21' extending from the base portion and outwardly from the profile plate 19' to an extent which corresponds to the thickness of the transporting plate 9. The cores 20, 20' form within the cavities 40, mold cavities 41 (FIGS. 4 and 7) which correspond to the shape of the one color or material component of the twocomponent object, that is, half objects. The cores 21, 21' form within the cavities 8, mold cavities 42 (FIGS. 5 and 6) which correspond to the shape of the whole object. The transporting plate 9 is movable in the opening direction of the mold relative to the stationary mold half 1 and to the movable mold half 19. The transporting plate 9 is mounted on the free end of a shaft 15 which serves as a drive shaft. The drive shaft 15 extends rearwardly through a central bore 38' of the movable clamping plate 38. When the mold is closed, the end of the shaft 15 is spaced from a stationary abutment 39 by a distance which corresponds to approximately one-half of the opening travel path of the movable mold half 19.

A guide and centering collar 32 serves to center the movable mold half 19 at the movable clamping plate 38 and at the same time serves as an axial guide and support bearing for the drive shaft 15.

The transporting plate 9 is axially displaceable along the horizontal axis of symmetry a—a of the mold, and pivotally displaceable as a unit with the drive shaft 15. The transporting plate 9 is provided with bores 10. These bores are disposed coaxially to the cores 20, 20' and 21, 21', when the mold is either completely closed or completely open. The inner diameter of the bores 10 is equal to or greater than the maximum diameter of the cores 20, 20' and 21, 21'.

The cores 20, 20' and 21, 21' are symmetrically disposed in the profile plate 19' with respect to the axis of symmetry a—a. The cavity inserts 8 and 49 are similarly symmetrically disposed in the cavity plate 2 with respect to, and to respectively opposite sides of, the axis a—a. The relative movement in the opening direction between the movable mold half 19 and the transporting plate 9 is controlled in such a way that the transporting plate 9 comes to lie on the side of the actual cores 20', 21' facing the movable clamping plate 38 when the mold is closed, and comes to lie on the other side of these cores when the mold is completely open.

When the mold is closed the transporting plate 9 partially limits the mold cavities 41 for the half objects. The partial limitation of the mold cavities 41 is effected in the area of the inner surfaces 10' which themselves limit the bores 10 in their entrance sections, as can be seen in FIGS. 1 and 4. In this way the transporting plate 9 takes part in the formation of the half objects. In the same manner the transporting plate 9 limits the mold cavities 42 for forming the whole objects when the mold is closed. This happens at the frontal faces 10'' of the transporting plate 9 which are disposed in the area of the bores 10, as can be seen in FIGS. 1 and 5. The inner surfaces 10' are so designed that each half object has a diameter at its base which is greater than the inner diameter of the bores 10. In this way, the half objects are retained by the transporting plate 9 when the cores 20, 20' are removed from the bores 10.

The rotation of the rotating drive shaft 15 for the transporting plate 9 is effected at the appropriate time by means of two diametrically disposed helical grooves 17 and 18 in the outer surface of the drive shaft 15, and two coaxially disposed stationary control pins 24 and 25, which are axially displaceably mounted in the movable mold half 19. Both helical grooves 17 and 18 terminate on both sides of the shaft 15 in diametrically disposed axial groove sections 17' and 18', respectively. The linear groove sections 17' and 18' are connected together via an idling groove section 44. The base area of the idling groove section 44 is inclined with respect to the axis a—a, and is inclined radially outwardly in the direction toward the stationary clamping plate 37.

The coaxially disposed control pins 24 and 25, which are diametrically disposed with respect to the shaft 15, are rotatably mounted in damping bushings 26 and 27, respectively, by means of roller bearings 33 and 34. The damping bushings 26 and 27 are each disposed in an abutment plate 23. The contact between the bushings 26 and 27 and their respective abutment plate 23 takes place through the intermediary of elastic O-rings 28. The control pins 24 and 25 are each biased toward the shaft 15 by spring 30 and 31, respectively. The springs 30 and 31 are mounted between annular flanges 24' and 25' of the pins 24 and 25 and an annular shoulder of a cover member 22.

Figure 3:
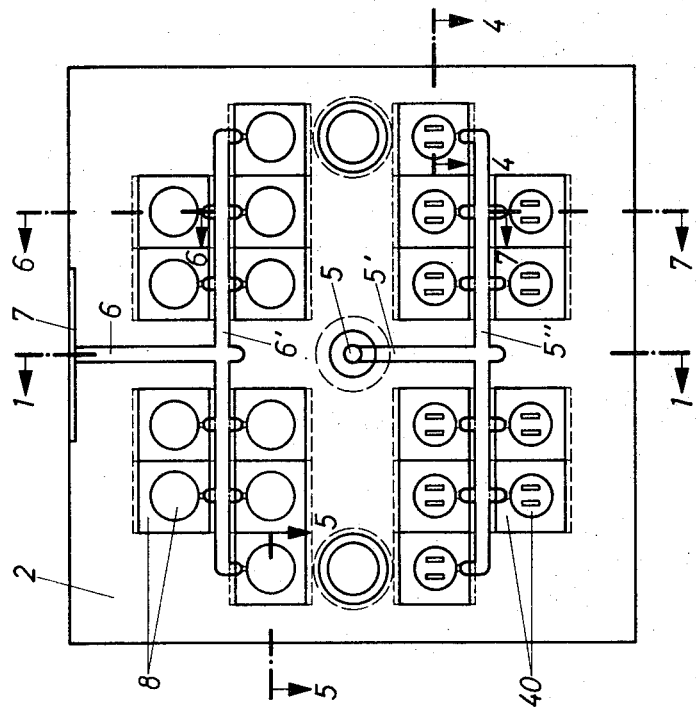
FIG. 3 is an elevational view of the injection mold of FIG. 1 viewed in the direction of arrow D of FIG. 1.
Figure 2:
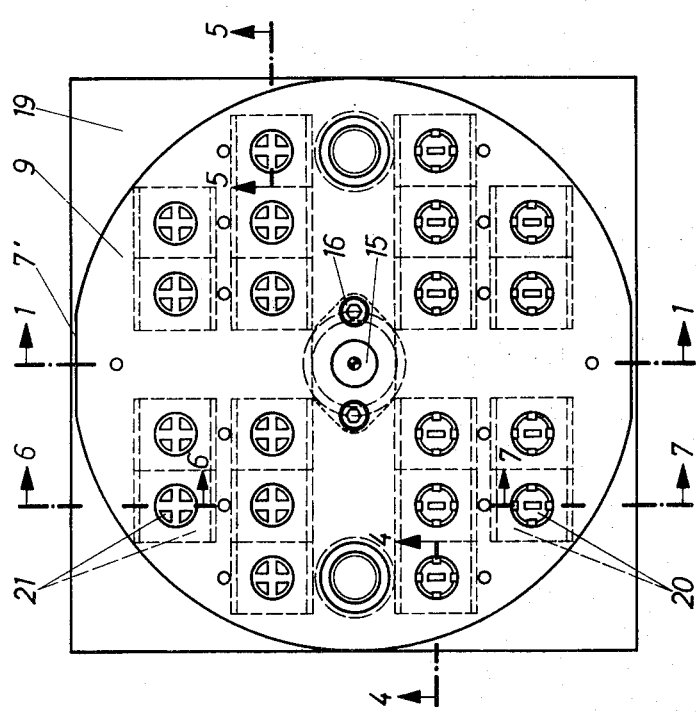
FIG. 2 is an elevational view of the injection mold of FIG. 1 viewed in the direction of arrow C of FIG. 1.
Figure 8:
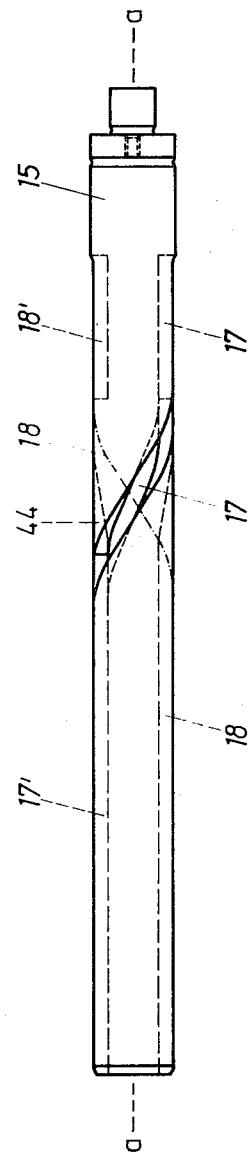
FIG. 8 is a longitudinal view of the transporting plate drive shaft shown in assembly in FIG. 1.
Figure 9:
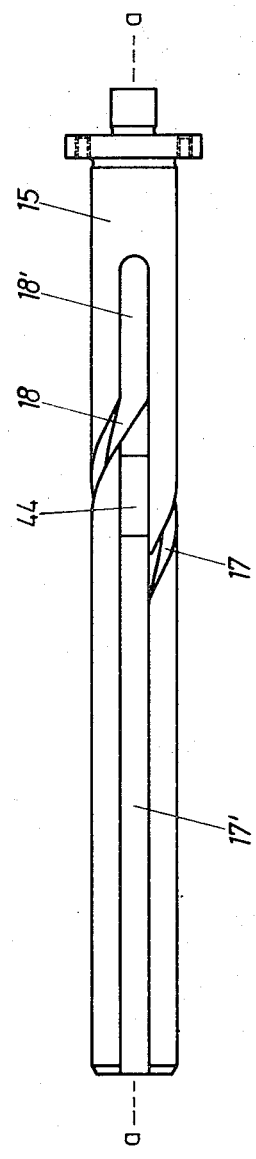
FIG. 9 shows the drive shaft of FIG. 8 rotated by 90° about its longitudinal axis.

The mold has a charging channel 5 which extends transverse to the parting line of the mold and which is supplied by an injection cylinder (not shown) in the direction A. The thermoplastic material for the half objects is introduced into the mold through the charging channel 5. As shown in FIG. 3, the channel 5 is in communication with the individual mold cavities 41 via a branch channel 5' leading off at a right angle and via a further, again perpendicularly extending, branch channel 5''. The cavities 42 for the whole objects are supplied with material for the second color or material component via a further charging channel 6 arranged to be supplied by an injection unit extending in the direction B. The charging channel 6 is in communication with the mold cavities 42 via a branch channel 6' which extends at a right angle to the channel 6. A ring 3 serves to center the stationary mold half 1 at the stationary clamping plate 37.

The charging channel 5 is formed by a charging sleeve 4. The charge formed in the charging channel 5 during each injection cycle is anchored in an undercut recess 14 formed in the transporting plate 9. The charge is pushed out of its anchored position during each opening cycle of the mold with the aid of an ejector 13. The ejector 13 is axially displaceably mounted in the drive shaft 15. When the mold is closed the ejector 13 protrudes out of the rear portion of the drive rod 15, while during the opening stroke of the mold the ejector 13 abuts against the abutment plate 39 and is thus axially moved to eject the charge anchored in the recess 14. When the mold is closed, centering pins 12, which are mounted in the profile plate 19, pass through the bores 11 in the transporting plate 9. Each centering pin 12 is provided with a protrusion 12' at its free end which has an undercut portion. At the above-mentioned undercut portions the charges formed in the channels 5, 5' and 5'' are anchored and are subsequently severed from their anchored positions by the transporting plate 9 when the mold is opened. Anchoring takes place because the protrusions 12' are diving in the channels 5'', 6', when the form is closed (FIG. 10). In the opening step corresponding to FIG. 11 the said charges 12' are extruded out of the channels 5, 5',5'' and are carried by the aggregate 38, 23, 29, 9. In the opening step corresponding to FIG. 12 the charges are severed and are falling down.

The abutment for the nozzle of the injection unit operating into the parting line in the direction B is provided by the nozzle abutment surface 7, 7'.

In the illustrated embodiment the first color component is injected in the direction A transverse to the parting line of the mold through the charging channel 5, and the branch channels 5' and 5''. The material for the half objects is passed through the charge opening 70, shown in FIG. 7, into the cavities 41. The second color component is injected in the direction B through the charging channel 6 and the branch channel 6'. The material for the whole object passes through the charge opening 71, shown in FIG. 6, into the cavities 42. If, however, for esthetic reasons it is preferred that the jacket of the cup-shaped whole object not have a cutoff mark, both color components are injected from the directions E, shown in FIG. 1, into the parting line between the profile plate 19' and the transporting plate 9. In this case the material passes through the appropriate charging channels (not shown) exclusively from the base side into the cavities 41 and 42 so that no cutoff marks will appear at the jacket of the whole objects.

The injection mold according to the present invention operates as follows:

With the mold closed, as shown in FIG. 10, the half objects produced during the preceding molding cycle in the mold cavities 41 are now disposed in the mold cavities 42 for the whole objects, while the cavities 41 are empty. The first color component or first material component is now injected into the mold cavities 41. Now the thermoplastic material for the half objects which forms the first color component is delivered in the direction A from an injection device (not shown) through the charging channel 5 and branch channels 5', 5'' and pressed into the mold cavities 41. At the same time the second color component or the second material component for forming the whole objects is injected into the mold cavities 41 in which the half objects are already disposed. The injection occurs through the charging channel 6 and branch channel 6' and in the direction B. Thereafter the mold is opened in a usual manner, causing the half objects formed in cavities 41 to be severed from the charge in channel 5'' by a cutting edge forming part of each charge opening 70. The movable clamping plate 38 together with the mold half 19 fastened thereto and the transporting plate 9 are displaced along the axis a—a away from the stationary mold half 1. The first stage of the opening stroke is shown in FIG. 11. As can be seen the free end of drive shaft 15 has reached the abutment 39. The charges formed in the charging channels 6, 6' and 5, 5', 5'' are drawn out of their forming channels in the course of this first stage of the opening stroke of the mold and are supported by their anchoring members 14 and 12', respectively. In the course of the further opening stroke of the mold, in which the mold is completely opened as shown in FIG. 12, the movable clamping plate 38 together with mold half 19 are moved further to the left by a distance which is approximately equal to the distance of the first stage. Since the transporting plate 9 is mounted to the shaft 15 so that it cannot move relative thereto and since the drive shaft 15 abuts the abutment 39 thereby preventing any further axial movement of the shaft 15, there results a relative movement between the movable mold half 19 and the transporting plate 9. In the course of this relative movement the control pins 24 and 25 first slide in the linear groove sections 18' and 17' and then in the helical groove sections 18 and 17. During the sliding of the stationary control pins in the helical groove sections 18 and 17 there results a pivoting movement of the transporting plate 9 by 180°.

At the beginning of the relative movement between the drive shaft 15 and the movable mold half 19 the transporting plate 9 is separated from the profile plate 19'. Thus the finished whole objects are pushed away from the cores 21, 21' so that they fall out of the mold. At the same time the half objects are stripped from the cores 20' by the transporting plate 9. Since these half objects are anchored in the area of the surfaces 10', they adhere to the transporting plate 9. After pivoting of the transporting plate 9 by 180°, the half objects come to lie coaxially to the cores 21', as can be seen in FIG. 1. When the mold is closed, the control pins 24 and 25 slide over the idling groove sections 44. As a result, a rotation of the shaft 15 does not occur during the closing stroke of the mold. Without a further rotation of the shaft 15 the transporting plate 9 does not pivot. Thus, the cores 21, 21' gain enter into the coaxial bores 10 of the transporting plate 9 and the cup-shaped half objects are slipped over the cores 21' or held thereby, for example. In the course of the further closing stroke of the mold the transporting plate 9, which is now in contact with profile plate 19', abuts against the cavity plate 2 with its cavity inserts 8 and 40. When the mold is closed, the mold cavities 42 for the whole objects and the mold cavities 41 for the half objects are thus newly formed, with the previously formed half objects being disposed in the mold cavities 42 for the whole objects and the mold cavities 41 for the half objects are empty, that is, ready to receive a subsequent injection of the first color or material component.

As can be seen in FIGS. 4–7, the second material or color component in the illustrated embodiment, which has a similar cupshape as the first color component, is injected over the first color component, with certain portions of the first color component passing through the second color component on the frontal face of the two-color object so that certain letter symbols or number symbols can appear at those points.

It will be understood that the above description of the present invention is susceptible to various modifications, changes and adaptations, and the same are intended to be comprehended within the meaning and range of equivalents of the appended claims.

I claim:

1. In an injection mold for an injection molding machine for manufacturing two-component plastic objects, the mold comprising: a movable mold half including a profile plate having at least two diametrically disposed mold cores; a stationary mold half including a mold cavity plate having at least two diametrically disposed cavities, each serving to form with a respective one of the mold cores a portion of the mold cavity of the twocomponent object, the shape of one-half of the mold cavities corresponds to the shape of part of the two-component object and the shape of the other half of the mold cavities corresponds to the shape of the whole of the two-component object; and means for transporting the partly formed two-component object from its respective mold cavity into a mold cavity which forms the whole of the two-component object, the transporting means being pivotally mounted in the mold on an axis which is parallel to the opening direction of the mold and effecting the transporting of the partly formed two-component object after the mold has been opened, the improvement comprising: a drive shaft passing through the movable mold half along said axis, said drive shaft terminating in a free end disposed between said movable and said stationary mold halves; a transporting plate forming part of the transporting means and being separate from the profile plate and the cavity plate and being movable in the opening direction of the mold relative to the stationary mold half and to the movable mold half, said transporting plate being attached to said free end of said drive shaft; a stationary clamping plate; means defining two helical grooves disposed diametrically in said drive shaft, the ends of each helical groove terminating in linear groove sections at diametrically opposite sides of said shaft, each said linear groove section for one said groove being in communication with one said linear groove section for the other said groove via a linear idling groove section, the base surface of said idling groove section being inclined with respect to the axis of symmetry of the mold and extending radially outwardly in the direction toward the stationary clamping plate; and control pin means mounted in the movable mold half and engaging said helical grooves, said grooves and pins being adapted to control the pivoting of said shaft and transporting plate.

2. In an injection mold for an injection molding machine for manufacturing two-component plastic objects, the mold comprising: a movable mold half including a profile plate having at least two diametrically disposed mold cores; a stationary mold half including a mold cavity plate having at least two diametrically disposed cavities, each serving to form with a respective one of the mold cores a portion of the mold cavity of the twocomponent object, the shape of one-half of the mold cavities corresponds to the shape of part of the two-component object and the shape of the other half of the mold cavities corresponds to the shape of the whole of the two-component object; and means for transporting the partly formed two-component object from its respective mold cavity into a mold cavity which forms the whole of the two-component object, the transporting means being pivotally mounted in the mold on an axis which is parallel to the opening direction of the mold and effecting the transporting of the partly formed two-component object after the mold has been opened, the improvement wherein the transporting means comprises a transporting plate separate from the profile plate and the cavity plate and movable in the opening direction of the mold relative to the stationary mold half and to the movable mold half, said transporting plate being provided with bores lying coaxially to the cores of the profile plate of the movable mold half when the mold is both open and closed, said transporting plate being further provided with inner surfaces within each of said bores, said surfaces being adapted to limit the mold cavities for part of the two-component objects when the mold is closed.

3. In an injection mold for an injection molding machine for manufacturing two-component plastic objects, the mold comprising: a movable mold half including a profile plate having at least two diametrically disposed mold cores; a stationary mold half including a mold cavity plate having at least two diametrically disposed cavities, each serving to form with a respective one of the mold cores a portion of the mold cavity of the twocomponent object, the shape of one-half of the mold cavities corresponds to the shape of part of the two-component object and the shape of the other half of the mold cavities corresponds to the shape of the whole of the two-component object; and means for transporting the partly formed two-component object from its respective mold cavity into a mold cavity which forms the whole of the two-component object, the transporting means being pivotally mounted in the mold on an axis which is parallel to the opening direction of the mold and effecting the transporting of the partly formed two-component object after the mold has been opened, the improvement comprising a transporting plate included in said transporting means, said transporting plate being separate from the profile plate and the cavity plate and being movable in the opening direction of the mold relative to the stationary mold half and to the movable mold half; a drive shaft; a clamping plate having a central bore; and a stationary abutment, wherein said drive shaft passes through said central bore and protrudes outwardly from said clamping plate toward said stationary abutment such that when the mold is closed, the distance from said drive shaft to said stationary abutment corresponds to approximately one-half the length of the opening stroke of the movable mold half.

4. An injection mold as defined in claim 1, said control pin means comprising two coaxially disposed control pins which are arranged diametrically opposite one another with respect to said shaft, bushing means, and associated bearing means for mounting said pins to the movable mold half.

5. An injection mold as defined in claim 4, further comprising two contact plate means and a plurality of elastic ring means, each said bushing means being disposed in one of said contact plate means and separated therefrom by a portion of said plurality of elastic ring means.

6. An injection mold as defined in claim 1, wherein said transporting plate is provided with bores which lie coaxially to the cores of the profile plate of the movable mold half when the mold is both open and closed.

7. An injection mold as defined in claim 6, wherein said transporting plate is provided with frontal faces disposed in the area of each of said bores, said frontal faces serving to partly define the mold cavities of the whole of the twocomponent objects.

8. An injection mold as defined in claim 2, wherein said inner surfaces are configured such that the bases for part of the two-component objects have a diameter which is larger than the inner diameters of said bores.

9. An injection mold as defined in claim 1, wherein each core has a cylindrical base portion which is releasably fastened in the profile plate and an outer portion extending from the base portion and outwardly from the profile plate to an extent which corresponds to the thickness of said transporting plate.

10. An injection mold as defined in claim 1, further comprising a movable clamping plate carrying the movable mold half and drive means which control the relative movement between the movable mold half and said transporting plate, wherein said transporting plate is provided with bores, said drive means effecting the control of such relative movement so that when the mold is closed said transporting plate is disposed to the side of the cores facing said movable clamping plate and when the mold is open said transporting plate is disposed to the other side of the cores.

11. An injection mold as defined in claim 1, further comprising means for interchangeably connecting said cores in the profile plate.

12. An injection mold as defined in claim 1, wherein the cavity plate is provided with interchangeable cavity inserts defining the cavities.

13. An injection mold as defined in claim 1, wherein the cores and the cavities for forming the mold cavities for part of the two-component object are arranged symmetrically to the cores and the cavities for forming the mold cavities of the whole of the two-component object, the symmetry being with respect to a horizontal mold axis.

14. An injection mold as defined in claim 1, further comprising means defining a charging channel extending transverse to the mold parting line and a charging channel extending into the parting line between said transporting plate and the cavity plate.

15. An injection mold as defined in claim 1, wherein said transporting plate forms part of each of the mold cavities which form part of the two-component object.

16. An injection mold as defined in claim 1, further comprising two charging channels which extend into the parting line between the profile plate and said transporting plate.

17. An injection mold as defined in claim 16, wherein the mold cavities are charged via said charging channels exclusively from the base in such a manner that no cut-off point is formed at the outer surface of the molded object.

* * * * *